April 23, 1963　　　H. R. DENNING　　　3,086,460
CENTER GAUGE
Filed May 24, 1961　　　2 Sheets-Sheet 1
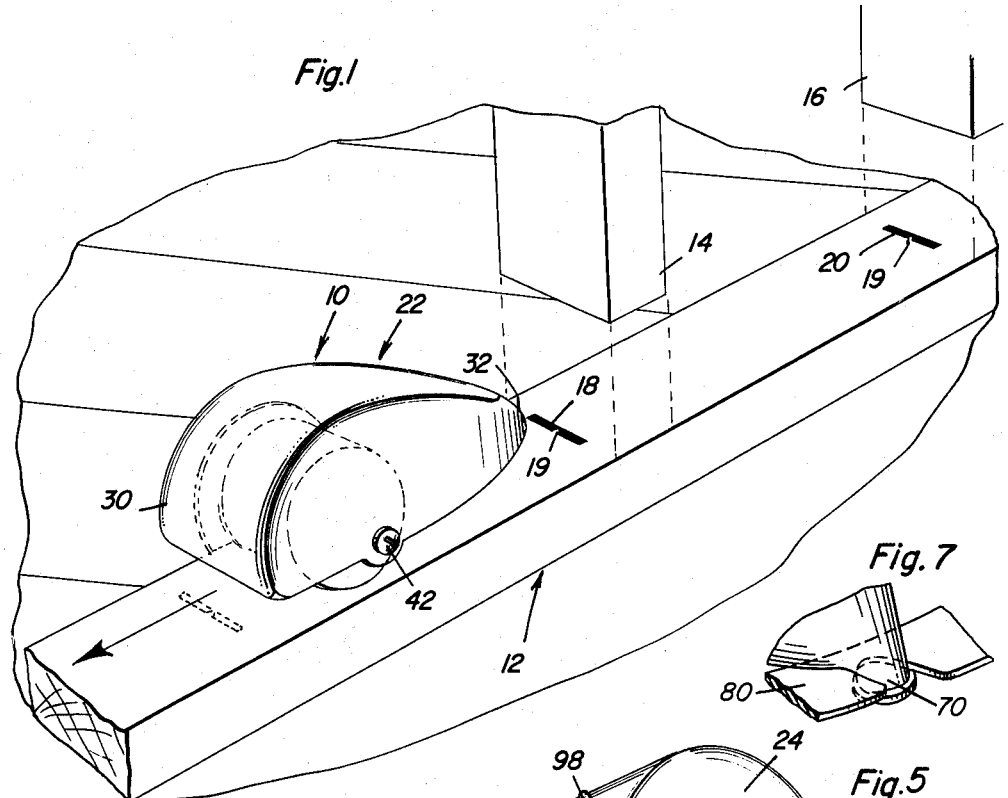
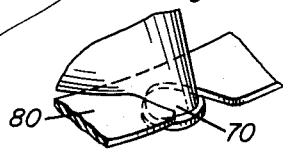
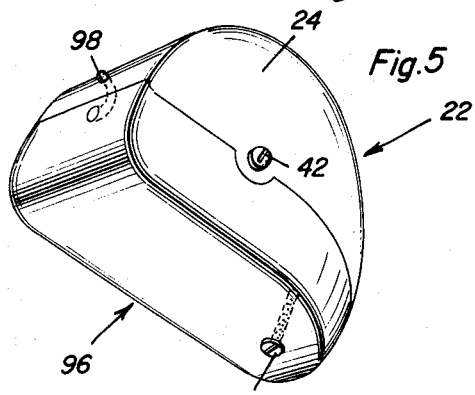
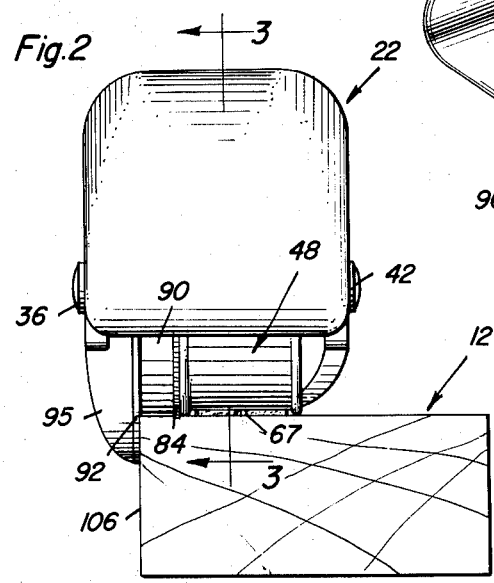
Harold R. Denning
INVENTOR.

April 23, 1963     H. R. DENNING     3,086,460
CENTER GAUGE
Filed May 24, 1961     2 Sheets-Sheet 2
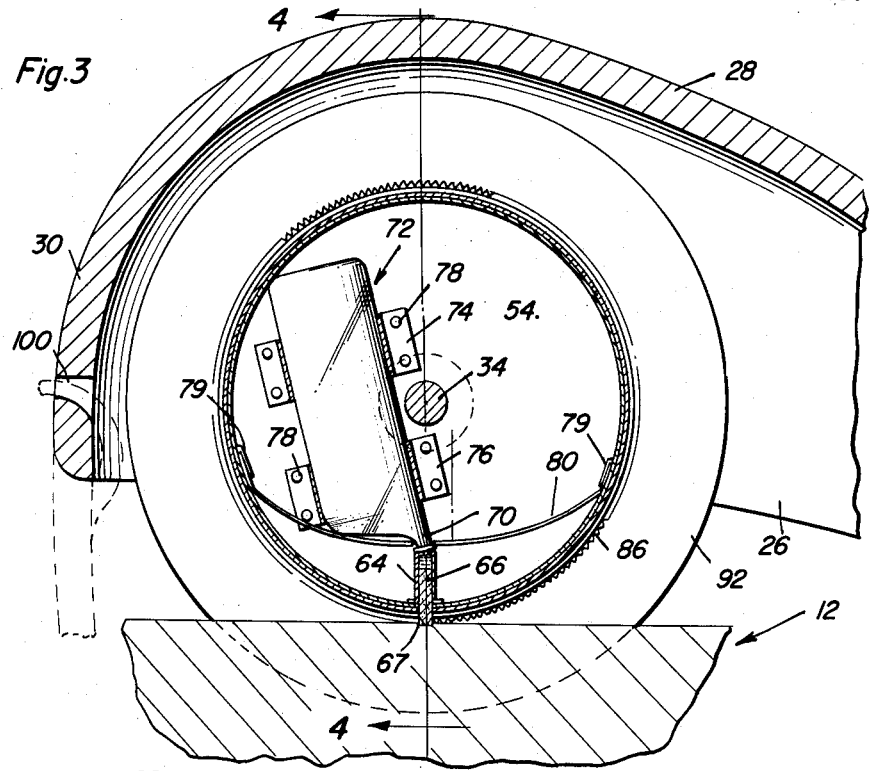
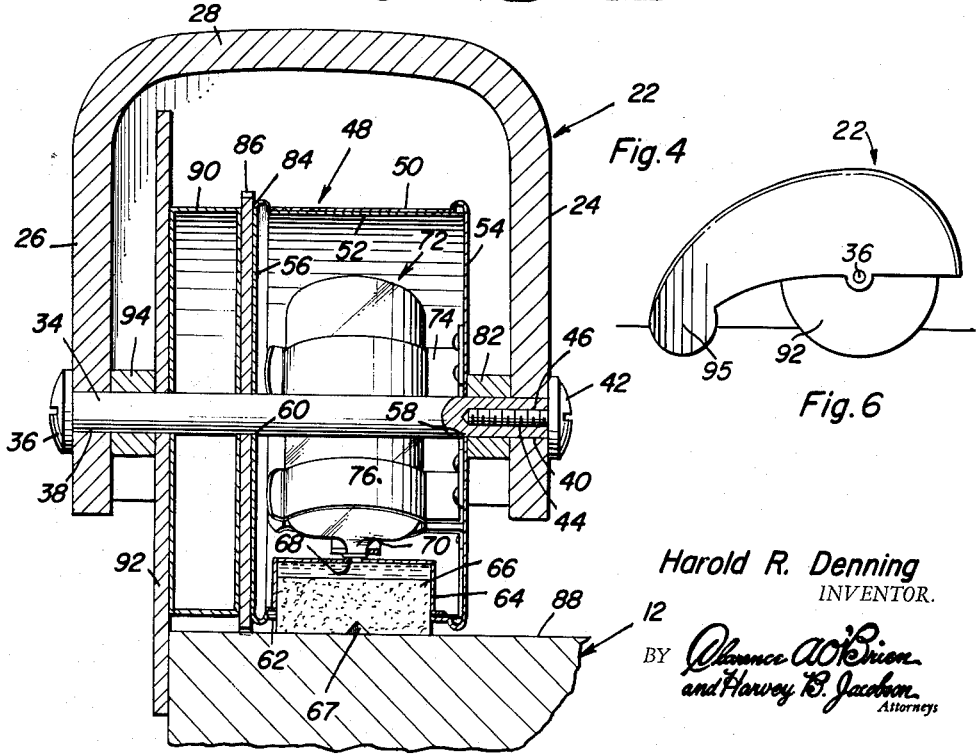
Harold R. Denning
INVENTOR.

United States Patent Office 3,086,460
Patented Apr. 23, 1963

3,086,460
CENTER GAUGE
Harold R. Denning, 944 Jackson Ave.,
Huntington, W. Va.
Filed May 24, 1961, Ser. No. 112,377
8 Claims. (Cl. 101—331)

This invention relates to a novel and useful stud plate marker and more specifically to a marking device adapted to, by a single movement along a stud plate, make positioning marks on a stud plate whereby the exact position of studs to be secured to the plate may be accurately determined before the stud is applied to the stud plate.

The stud plate marker of the instant invention includes a housing having a marking drum rotatably journalled therein and the marking drum is provided with an applicator which extends longitudinally thereof and projects slightly outwardly beyond the outermost circumferential edges of the drum whereby as the drum is rolled over the upper surface of a stud plate ink or other suitable marking fluid may be dispensed by the applicator at predetermined points along the stud plate for marking the exact positions of studs which are subsequently to be secured to the stud plate.

The effective over-all circumference of the drum including the slightly outwardly projecting applicator is eight inches which enables the drum to accurately mark a stud plate at eight inch intervals. In this manner, studs may be accurately positioned at eight, sixteen, twenty-four and thirty-two inch intervals. The spacing of studs is sometimes on twenty-four inch centers while other framing studs on the same job might be on sixteen inch centers. Accordingly, the stud plate marker of the instant invention may be utilized to accurately mark sixteen and twenty-four inch centers as well as other centers which are multiples of eight. The marking drum is provided with a toothed disc in order that slippage between the marking drum and damp wood may be completely eliminated and the housing of the stud plate marker is provided with a pair of longitudinally spaced guide flanges which are also spaced laterally of the marking drum and its toothed disc whereby it will be assured that the drum and the toothed disc will be moved over the center of a stud while one edge of the stud is in sliding frictional engagement with the longitudinally spaced guide flanges.

The main object of this invention is to provide a stud plate marker which may be conveniently utilized to accurately predetermine the position at which studs will be subsequently secured to a stud plate.

A further object of this invention, in accordance with the immediately preceding object, is to provide a stud plate marker utilizing a fibrous or similar applicator for applying marking ink and the like to stud plates with a readily removable ink reservoir being carried by the drum and maintained in constant communication with the fibrous applicator.

Still another object of this invention is to provide the stud plate marker with a housing from which the marking drum and guide flanges project with a closure cover being provided for the housing and removably secured thereto in order that the marking drum and guide flanges of the marker may be completely enclosed when not in use.

A final object to be specifically enumerated herein is to provide an improved stud plate marker which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a portion of unfinished building construction shown with the stud plate marker of the instant invention positioned to accurately mark the points at which studs are to be subsequently secured to a stud plate;

FIGURE 2 is a front end elevational view of the stud plate marker shown in an operative position on a stud plate and in somewhat of an enlarged scale;

FIGURE 3 is an enlarged fragmentary longitudinal vertical sectional view taken substantially upon the plane indicated by the section line 3—3 of FIGURE 2;

FIGURE 4 is a transverse vertical sectional view taken substantially upon the plane indicated by the section line 4—4 of FIGURE 3;

FIGURE 5 is a perspective view of the stud plate marker shown with the closure cover operatively secured thereto;

FIGURE 6 is a side elevational view of the stud plate marker; and

FIGURE 7 is a partial perspective view of one manner of engaging a spring with the reservoir neck.

Referring now more specifically to the drawings the numeral 10 generally designates the stud plate marker of the instant invention. In FIGURE 1 of the drawings it will be seen that the stud plate marker is disposed on the upper surface of a stud plate generally referred to by the reference numeral 12 to which studs 14 and 16 are to be subsequently secured. The stud plate 12 has been marked as at 18 and 20 to indicate the proper positions for the studs 14 and 16 respectively.

The stud plate marker includes an open bottom housing generally referred to by the reference numeral 22 which is substantially inverted U-shaped in cross section and includes side walls 24 and 26 interconnected by means of an upper wall 28. The housing 22 also includes a downwardly curving front wall 30 and a downwardly curving rear wall 32.

A shaft 34 having a laterally enlarged head portion 36 on one end is secured through the aligned apertures 38 and 40 in the side walls 26 and 24 by means of a threaded fastener 42 having a shank portion 44 threadedly engaged in a threaded blind bore 46. A marking drum assembly generally referred to by the reference numeral 48 includes two telescopingly engaged cylindrical sections 50 and 52 which are provided with closure end walls 54 and 56 respectively. The closure end walls are centrally apertured as at 58 and 60 respectively and the shaft 34 extends through the end walls 54 and 56 to rotatably journal the marking drum 48.

The cylindrical section 50 is provided with a slot 62 and the cylindrical section 52 is provided with a generally rectangular outwardly opening recess 64 which is normally aligned with the slot 62 of the section 50. A fibrous applicator 66 is slidably disposed in the recess 64 and it may be observed from FIGURE 3 of the drawings that the recess 64 extends generally radially of the shaft 34 and opens outwardly. Accordingly, the fibrous applicator 66 is mounted for radial movement in the recess 64. The recess 64 includes an inwardly opening inlet 68 and the outlet neck 70 of a fluid reservoir generally referred to by the reference numeral 72 is disposed in communication with the inlet 68. The fluid reservoir 72 is removably secured to the end wall 54 of the cylindrical section 50 by means of spring clamps 74 and 76 which are secured to the end wall 54 in any convenient manner such as by fasteners 78. It will further be noted that a leaf spring 80 is removably secured to the outlet neck 70 and has its opposite ends received in sockets 79 secured to the internal surfaces of the cylindrical section 52 in order to yieldably urge the outlet neck 70 into sealed communication with the inlet 68.

A spacer 82 is disposed between the side wall 24 and the end wall 54 and a disc 84 is fixedly secured to the end wall 56 and is provided with teeth 86 for engagement with the upper surface 88 of the stud plate 12 to ensure that the marking drum 48 will not slide relative to the stud plate 12. A spacer 90 is positioned outwardly of the outer face of the disc 84 and a guide flange or disc 92 is rotatably journalled on the shaft 34 outwardly of the spacer 90. A spacer 94 similar to spacer 82 is disposed between the guide disc 92 and the side wall 26 of the housing 22.

With attention now directed to FIGURE 5 of the drawings it will be noted that the housing 22 includes a removable bottom wall cover generally referred to by the reference numeral 96 which may be utilized to completely enclose the marking drum 48 and the guide disc 92 within the housing 22. The forward end of the bottom wall 96 is provided with a hook 98 engageable with the aperture 100 formed in the front wall 30 and the rear end of the bottom wall 96 is removably secured to the housing 22 by means of a threaded fastener 104. In operation, the position of the first stud to be secured to the stud plate 12 may be determined by conventional methods. Then, the plate marker 10 may be positioned on the stud plate 12 with the fibrous applicator 66 aligned with the previously determined position of the first stud to be secured to the stud plate 12. Then, the plate marker 10 may be moved longitudinally of the stud plate 12 with the guide disc 92 and the rear guide 95 carried by the side wall 26 in sliding contacting relation with the side face 106 of the stud plate 12. As the fibrous applicator 66 engages the stud plate 12 the stud plate 12 will be marked as at 18 and 20 to accurately determine the positions at which the studs 14 and 16 are to be subsequently secured to the stud plate 12.

The fluid reservoir 72 may be provided with suitable closure means and a carpenter may be provided with two or more fluid reservoirs 72 in order that a fresh reservoir 72 may be inserted for a depleted reservoir within the marking drum 48 as the replacement of marking fluid is required.

From FIGURES 2-4 of the drawings it may be seen that the applicator 66 is provided with a notch 67 that enables one side edge of each of the marks 18 and 20 to be provided with a notch 19, see FIGURE 1. The notches 19 indicate to a workman which edge of the marks 18 and 20 are to be aligned with the side faces of the studs 14 and 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stud plate marker comprising an open bottom housing, a marking drum rotatably mounted in said housing, marking means carried by said drum and including an applicator projecting slightly outwardly beyond the outermost circumferential edges of said drum for applying a mark to the surface over which said drum is being rolled, said drum including fluid removable and readily replaceable reservoir means separate from but communicated with said applicator, said reservoir means including a sealed container having an outlet opening, said drum including resilient spring clip means within said drum removably securing said sealed container therein with its outlet opening communicated with said applicator.

2. A marking device comprising an open bottom housing having first and second side walls, an upper wall, a downwardly curving front wall and a downwardly curving rear wall, a shaft secured between the side walls, a marking drum rotatably mounted on the shaft, a first spacer spacing the drum from the first side wall, a toothed work engaging disc secured to the opposite end of said marking drum of a diameter to position the outer extremities of its circumferentially disposed teeth slightly beyond the outermost circumferential edge of said drum, a guide disc rotatably journalled on the shaft and spaced axially from said work engaging disc, said guide disc being larger in diameter than the drum and adapted to engage the side of the work, a second spacer disposed about said shaft and spacing the guide disc from the second side wall, and a rear guide carried by said housing spaced laterally from but in alignment with said guide disc, said drum including first and second telescopingly engaged cylindrical sections, the first section being provided with a slot, the second section being provided with a rectangular outwardly opening recess, said recess being normally aligned with the slot upon telescoping of the sections, and an applicator slidably disposed in the recess and projecting beyond said slot.

3. The combination of claim 2 including an inwardly opening inlet located in the bottom of the recess, a fluid reservoir including a sealed container having an outlet opening removably secured to the interior of the drum by resilient clip means with its outlet opening communicated with inlet opening, and a spring means yieldably urging the outlet opening into sealed communication with the inlet opening.

4. The combination of claim 3 wherein one lower projecting edge of the applicator is provided with a notch therein.

5. The combination of claim 4 including a removable bottom wall for said housing, an aperture in the lower portion of the housing front wall, an upward and outward projecting hook on the front of the bottom wall engageable with the aperture, and bolt means through the rear of the bottom wall engageable with the rear of the housing.

6. The combination of claim 2 including a notch in the lower projecting forward edge of the applicator.

7. A marking device comprising an open bottom housing having first and second side walls, an upper wall, a downwardly curving front wall and a downwardly curving rear wall, a shaft secured between the side walls, a marking drum rotatably mounted on the shaft, a first spacer spacing the drum from the first side wall, a toothed work engaging disc secured to the opposite end of said marking drum of a diameter to position the outer extremities of its circumferentially disposed teeth slightly beyond the outermost circumferential edge of said drum, a guide disc rotatably journalled on the shaft and spaced axially from said work engaging disc, said guide disc being larger in diameter than the drum and adapted to engage the side of the work, a second spacer disposed about said shaft and spacing the guide disc from the second side wall, a rear guide carried by said housing spaced laterally from but in alignment with said guide dis, a removable bottom wall for said housing, an aperture in the lower portion of the housing front wall, an upward and outward projecting hook on the front of the bottom wall pivotally engageable with the aperture, and bolt means through the rear of the bottom wall engageable with the rear of the housing.

8. A marking device comprising an open bottom housing, a marking drum rotatably mounted in said housing, said drum including first and second telescopingly engaged cylindrical sections, the first section being provided with a slot, the second section being provided with a rectangular outwardly opening recess, said recess being normally aligned with the slot upon telescoping of the sections, and an applicator slidably disposed in the recess projecting beyond said slot.

References Cited in the file of this patent
UNITED STATES PATENTS

| | | |
|---|---|---|
| 549,350 | Fishback | Nov. 5, 1895 |
| 1,215,900 | Black et al. | Feb. 13, 1917 |
| 2,451,595 | Wheeler | Oct. 19, 1948 |
| 2,513,419 | Mann | July 4, 1950 |
| 3,046,884 | Pearson | July 31, 1962 |